United States Patent
Diorio et al.

(10) Patent No.: US 10,733,395 B1
(45) Date of Patent: Aug. 4, 2020

(54) LOCATION-BASED ACCESS TO RFID TAG INFORMATION

(71) Applicant: Impinj, Inc., Seattle, WA (US)

(72) Inventors: Christopher J. Diorio, Shoreline, WA (US); Scott A. Cooper, Seattle, WA (US); Kurt E. Sundstrom, Woodinville, WA (US); Todd E. Humes, Shoreline, WA (US); Alberto Pesavento, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 16/270,611

(22) Filed: Feb. 8, 2019

Related U.S. Application Data

(63) Continuation of application No. 15/945,788, filed on Apr. 5, 2018, now Pat. No. 10,204,245, which is a continuation of application No. 15/360,411, filed on Nov. 23, 2016, now Pat. No. 9,959,435.

(60) Provisional application No. 62/259,916, filed on Nov. 25, 2015.

(51) Int. Cl.
*G06K 7/10* (2006.01)
*G06F 21/62* (2013.01)
*H04W 4/80* (2018.01)
*H04W 12/08* (2009.01)

(52) U.S. Cl.
CPC ..... *G06K 7/10257* (2013.01); *G06F 21/6209* (2013.01); *H04W 4/80* (2018.02); *H04W 12/08* (2013.01); *G06F 2221/2111* (2013.01)

(58) Field of Classification Search
CPC ........ H04W 12/06; G06F 21/35; G06F 21/77; G06F 21/31; G06Q 30/06; G06K 7/00; H04L 29/06
USPC ....................................................... 455/456.1
See application file for complete search history.

(56) References Cited

U.S. PATENT DOCUMENTS

| | | | |
|---|---|---|---|
| 7,388,491 B2 | 6/2008 | Chand et al. | |
| 8,301,594 B2 * | 10/2012 | Nihei | G06F 16/907 707/621 |
| 8,583,924 B2 | 11/2013 | Caballero et al. | |
| 8,629,773 B2 | 1/2014 | Rhie et al. | |
| 8,698,598 B2 | 4/2014 | Morse et al. | |
| 8,884,744 B2 | 11/2014 | Bellows et al. | |
| 8,896,420 B2 | 11/2014 | Chang et al. | |
| 9,204,257 B1 * | 12/2015 | Mendelson | G08G 1/14 |
| 9,239,941 B1 | 1/2016 | Diorio | |
| 9,322,974 B1 * | 4/2016 | Giobbi | G06K 7/10366 |
| 9,338,605 B2 * | 5/2016 | Guba | H04W 4/027 |
| 9,563,793 B2 * | 2/2017 | Jones | G06K 7/10356 |
| 9,609,281 B2 | 3/2017 | Mariadoss | |
| 9,721,076 B2 | 8/2017 | Lowe | |

(Continued)

*Primary Examiner* — Nam V Nguyen
(74) *Attorney, Agent, or Firm* — Hertzberg, Turk & Associates, LLC

(57) ABSTRACT

Embodiments are directed to restricting access to Radio Frequency Identification (RFID) tag information based on location. Access to RFID tag information may be restricted at the reader level, at the requester level, and at the network level. When reader-level restrictions exist, devices may be prevented from inventorying tags and retrieving information from tags. When requester-level restrictions exist, a requester or device may be prevented from receiving tag information from inventoried tags or a network. When network-level restrictions exist, a network may discard or otherwise restrict tag information received from devices.

20 Claims, 10 Drawing Sheets

(56) References Cited

U.S. PATENT DOCUMENTS

| | | |
|---|---|---|
| 9,959,435 B1 | 5/2018 | Diorio et al. |
| 10,204,245 B1* | 2/2019 | Diorio ................ G06K 7/10257 |
| 2002/0089434 A1 | 7/2002 | Ghazarian |
| 2006/0082457 A1 | 4/2006 | Artem et al. |
| 2007/0018820 A1 | 1/2007 | Chand et al. |
| 2007/0126581 A1* | 6/2007 | Sung ........................ G07C 9/28 |
| | | 340/572.1 |
| 2008/0001718 A1 | 1/2008 | Karabinis |
| 2010/0259611 A1 | 10/2010 | Keshavarzian et al. |
| 2010/0309017 A1 | 12/2010 | Ramchandran et al. |
| 2012/0286929 A1 | 11/2012 | Kline |
| 2013/0257589 A1* | 10/2013 | Mohiuddin ............ G08C 17/02 |
| | | 340/5.61 |
| 2014/0155086 A1 | 6/2014 | Bhatia |
| 2014/0301379 A1 | 10/2014 | Shoarinejad |
| 2014/0375421 A1* | 12/2014 | Morrison ............ H04L 63/0861 |
| | | 340/5.61 |
| 2017/0328996 A1 | 11/2017 | Shoarinejad et al. |

* cited by examiner

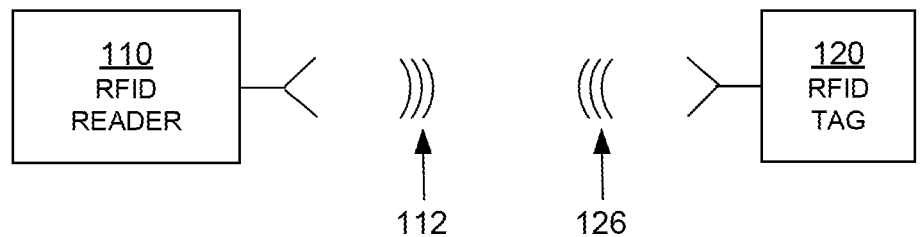
FIG. 1
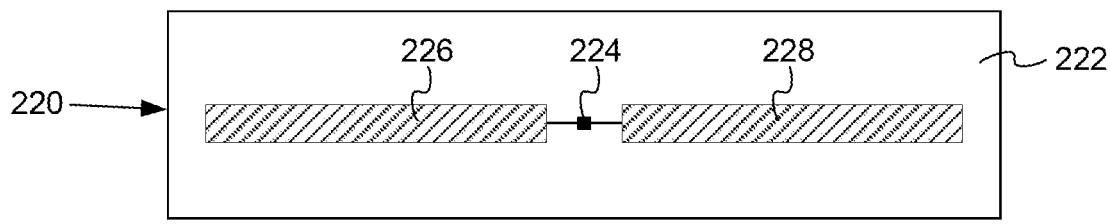
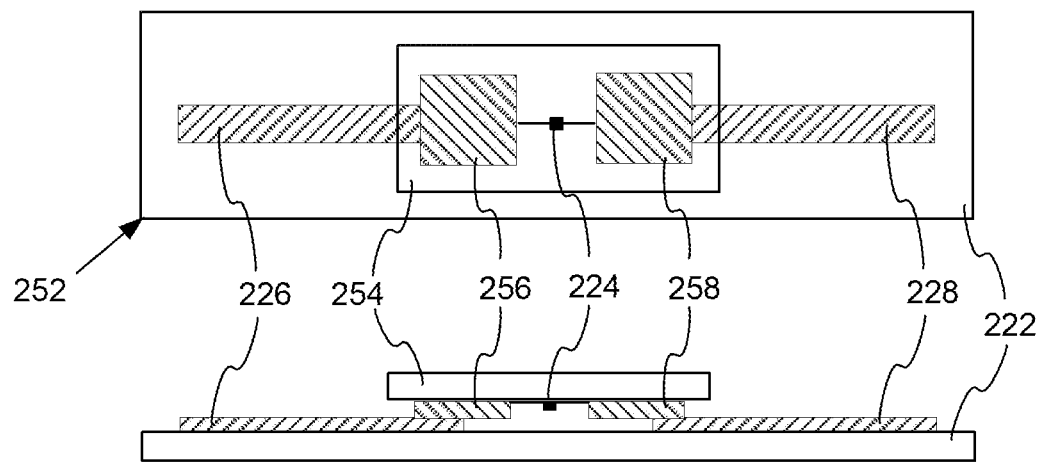
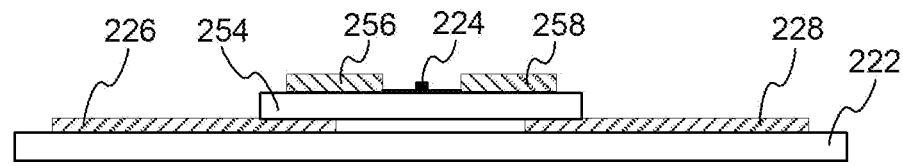
FIG. 2

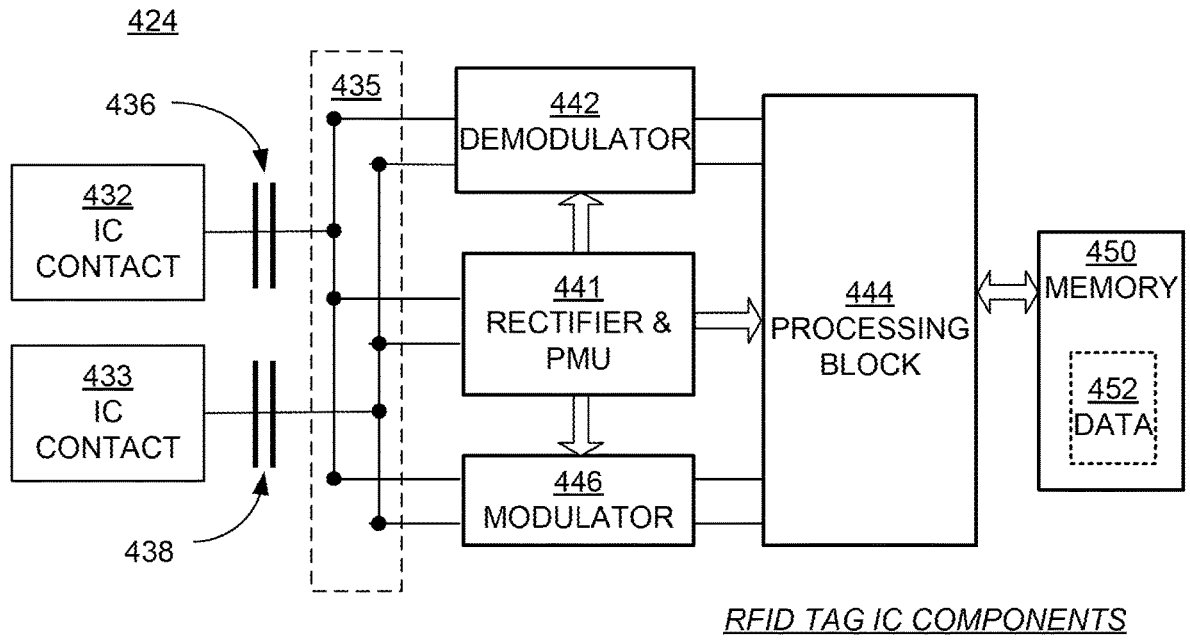
FIG. 4
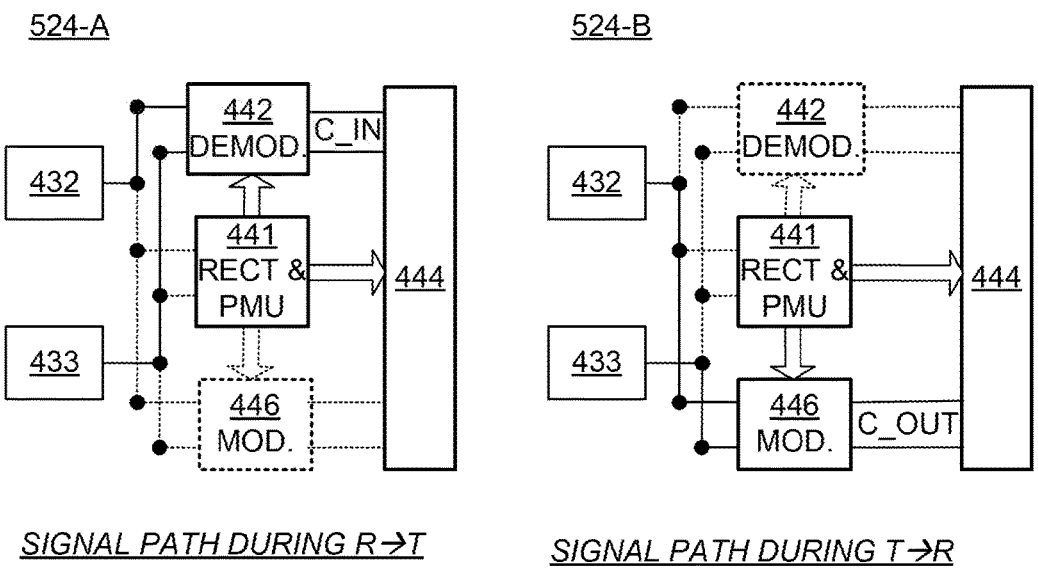
FIG. 5A  FIG. 5B

LOCATION-BASED ACCESS TO RFID TAG INFORMATION

CROSS REFERENCE TO RELATED APPLICATIONS

This Application is a continuation under 35 U.S.C. § 120 of co-pending U.S. patent application Ser. No. 15/945,788 filed on Apr. 5, 2018 (now U.S. Pat. No. 10,204,245), which is a continuation under 35 U.S.C. § 120 of U.S. patent application Ser. No. 15/360,411 filed on Nov. 23, 2016 (now U.S. Pat. No. 9,959,435), which claims the benefit of U.S. Provisional Patent Application Ser. No. 62/259,916 filed on Nov. 25, 2015. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader—tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

As Radio-Frequency Identification (RFID) applications become more mainstream, RFID tags and readers will become more widespread. Currently, many consumer portable devices such as smartphones already include near field communication (NFC) devices, operable to communicate with other NFC devices and tags over relatively short range (e.g., less than or equal to about 10 cm). Commercial handheld RFID readers with relatively long range (e.g., greater than about 10 cm) are also common, used primarily for inventorying applications in retail and wholesale settings. It is likely that future consumer portable devices will also implement long-range RFID reader capability. However, increases in the number of portable long-range RFID reader devices will be accompanied by concerns about interference and privacy.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to restricting access to Radio Frequency Identification (RFID) tag information based on location. Access to RFID tag information may be restricted at the reader level, at the requester level, and at the network level. When reader-level restrictions exist, devices may be prevented from engaging tags (e.g., inventorying, energizing, retrieving data from, sending data to, and/or forwarding data from tags). When requester-level restrictions exist, a requester (an entity or a device) may be prevented from receiving tag information from inventoried tags or a network. When network-level restrictions exist, a network may discard or otherwise restrict tag information received from devices.

According to some examples, a method for an RFID reader to restrict access to RFID tag information based on reader location is provided. The method includes determining the reader is in a first location, receiving a first request for first tag information while the reader is in the first location, determining that the reader is not authorized to engage tags in the first location, and refraining from responding to the first request with the first tag information. The method further includes determining the reader is in a second location different from the first location, receiving a second request for second tag information while the reader is in the second location, determining that the reader is authorized to engage tags in the second location, retrieving the second tag information, and responding to the second request with the second tag information.

According to other examples, a method to restrict RFID tag information based on location is provided. The method includes receiving first tag information from a reader system, determining that the reader system is in a first location, determining that the reader system is not authorized to engage tags in the first location, and indicating that the first tag information is restricted in response to determining that the reader system is not authorized to engage tags in the first location. The method may further include receiving second tag information from the reader system, determining that the reader system is in a second location different from the first location, determining that the reader system is authorized to engage tags in the second location, and indicating that access to the second tag information is authorized in response to determining that the reader system is authorized to engage tags in the second location.

According to further examples, an RFID reader configured to restrict access to RFID tag information based on reader location is provided. The reader includes an interface module configured to receive requests for tag information, a transceiver module configured to transmit commands to and receive information from RFID tags, and a processor module. The processor module may be configured to receive a first request for first tag information while the reader is in a first location from the interface module, determine that the reader is not authorized to engage tags in the first location, and refrain from responding to the first request with the first tag information. The processor module may be further configured to receive a second request for second tag information while the reader is in a second location different from the first location from the interface module, determine that the reader is authorized to engage tags in the second location, retrieve the second tag information via the transceiver module, and respond to the second request with the second tag information.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
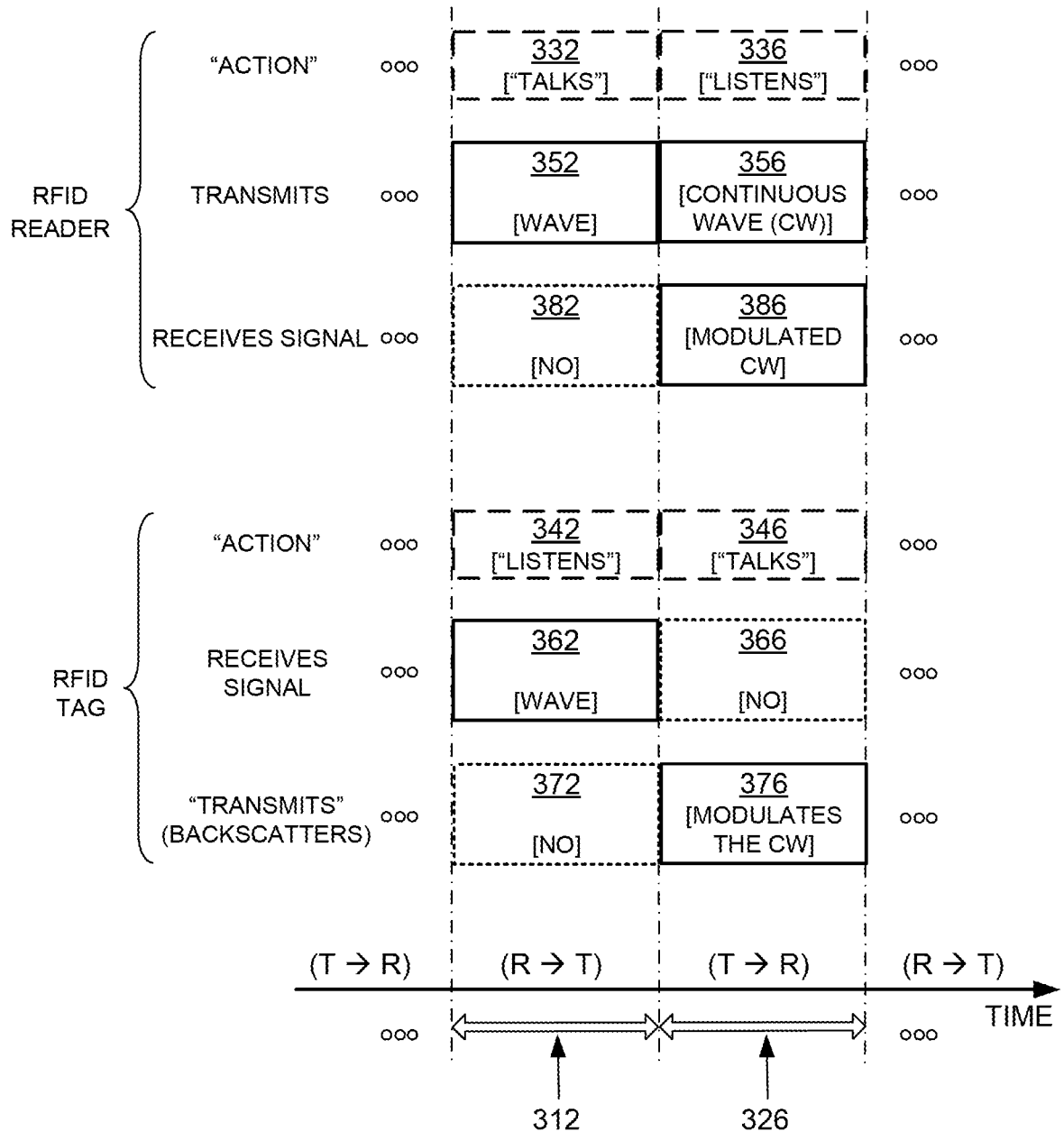
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able of harvest sufficient power to transmit signals), then IC 224 may respond by transmitting response signal 126.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
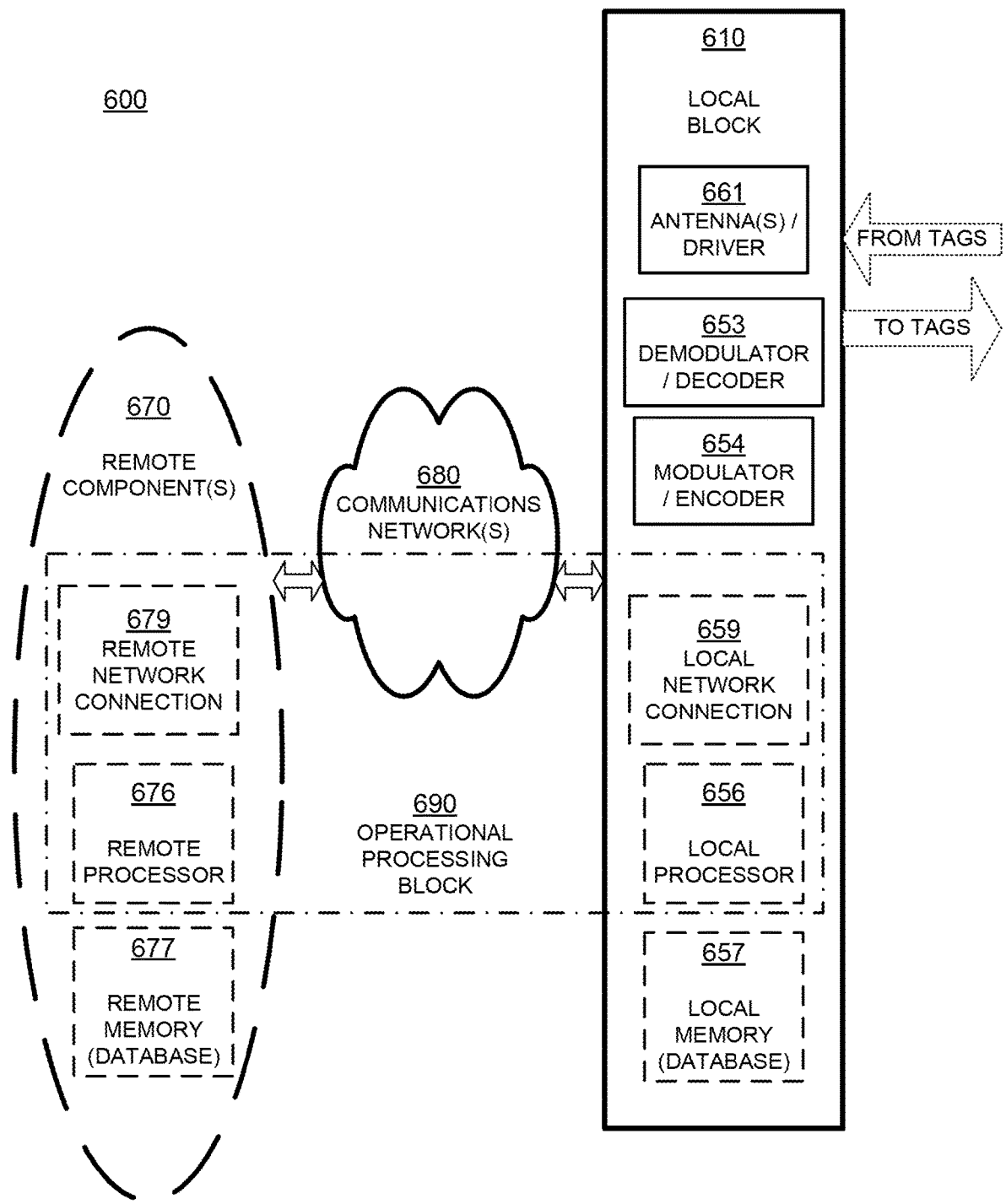
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. For example, local block 610 or portions of local block 610 may be implemented as a standalone device or as a component in another device. In some embodiments, local block 610 or portions of local block 610 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with RFID tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 651 may be a phased-array antenna or synthesized-beam antenna (SBA), and local block 610 may be implemented in a synthesized-beam reader (SBR) configured to generate one or more beams via the SBA. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, encryption/authentication algorithms, algorithms for tracking tag location or movement, secret keys, key pairs, individual public and/or private keys, electronic signatures, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680 or may couple to a separate device or component configured to communicate with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They may communicate with each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an encryption/authentication function and/or a tag location/tracking function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

One or more of the above-described elements may be combined and designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
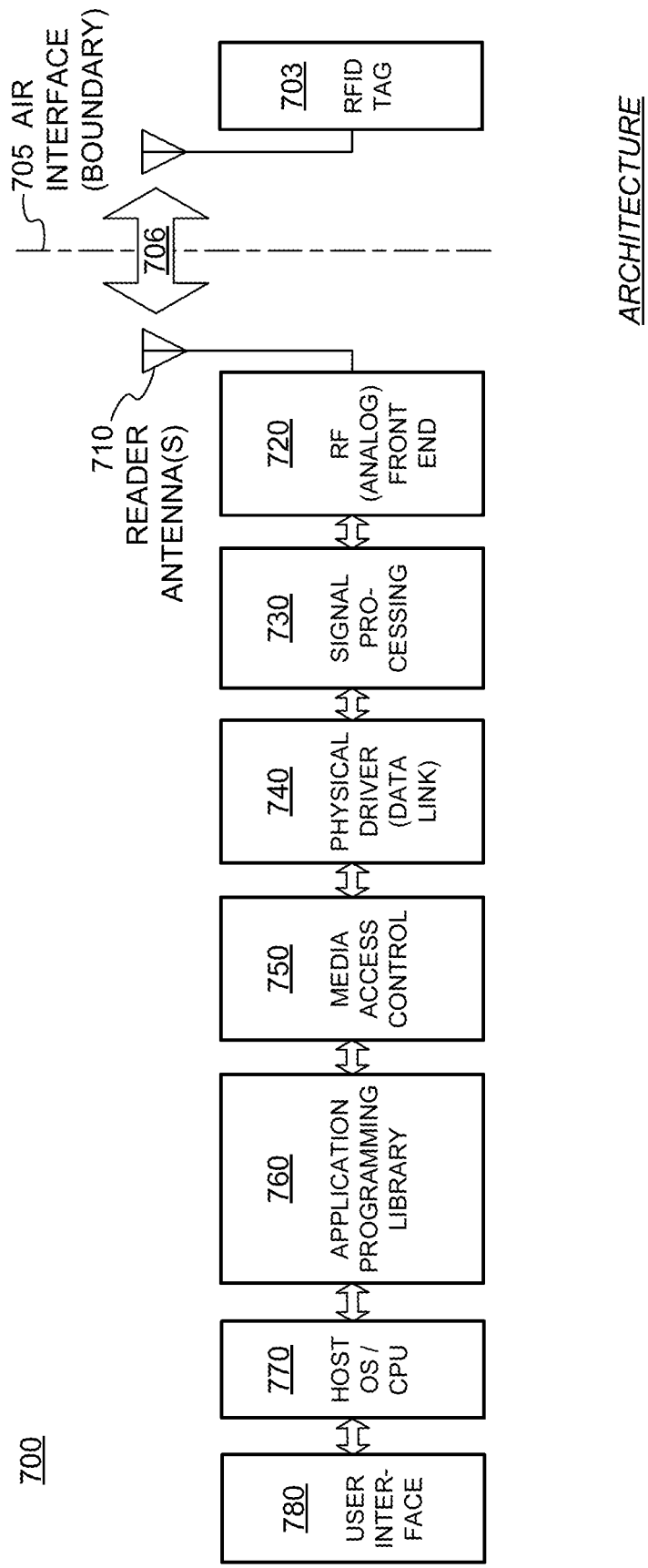
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them. In some embodiments RFID system 700 can be incorporated into another electronic device such as a checkout terminal in a store or a consumer device such as a mobile phone.

As mentioned previously, embodiments are directed to usage of mobile RFID readers. Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

As RFID technology becomes more widespread, concerns about privacy will also grow. Current RFID readers and tags may be configured to automatically exchange information when within range. For example, a reader may automatically attempt to inventory a nearby tag, and the tag may be configured to automatically respond to the inventorying reader with an identifier for the tag and/or an associated item. However, there may be circumstances in which readers and tags should not automatically exchange information. For example, individuals possessing items having RFID tags may not want unauthorized readers to inventory and/or identify the tags and items. Similarly, homeowners may not want tagged items within their homes to be inventoried and/or identified by unauthorized readers passing by the premises or associated with guests within the home.

To address privacy issues, restrictions may be placed on when and where an entity may engage with RFID tags. In the context of this disclosure, an entity "engages" with a tag when it inventories, energizes (e.g., supplies power to), receives data from, sends data to, and/or forwards data from, the tag. RFID readers configured to directly interact with RFID tags may engage tags. An entity configured to communicate with RFID readers may also engage tags, via the RFID readers.

In some embodiments, RFID tags may be configured to prevent unauthorized entities from engaging with them. For example, an RFID tag may refrain from responding to commands from unauthorized readers, or may respond with obfuscated or truncated information. In some embodiments, RFID readers themselves may be configured to prevent unauthorized engagement with RFID tags. In situations where a network server provides tag information to readers, the network server may prevent unauthorized tag engagement by refraining from providing tag information to unauthorized entities. Authorization may be based on identity (e.g., of the reader, a requester of tag information associated with the reader, the engaged tag, and/or the optional network server), location (e.g., of the reader, the requester, or the engaged tag), and/or the content of the information to be exchanged.

Figure 8:
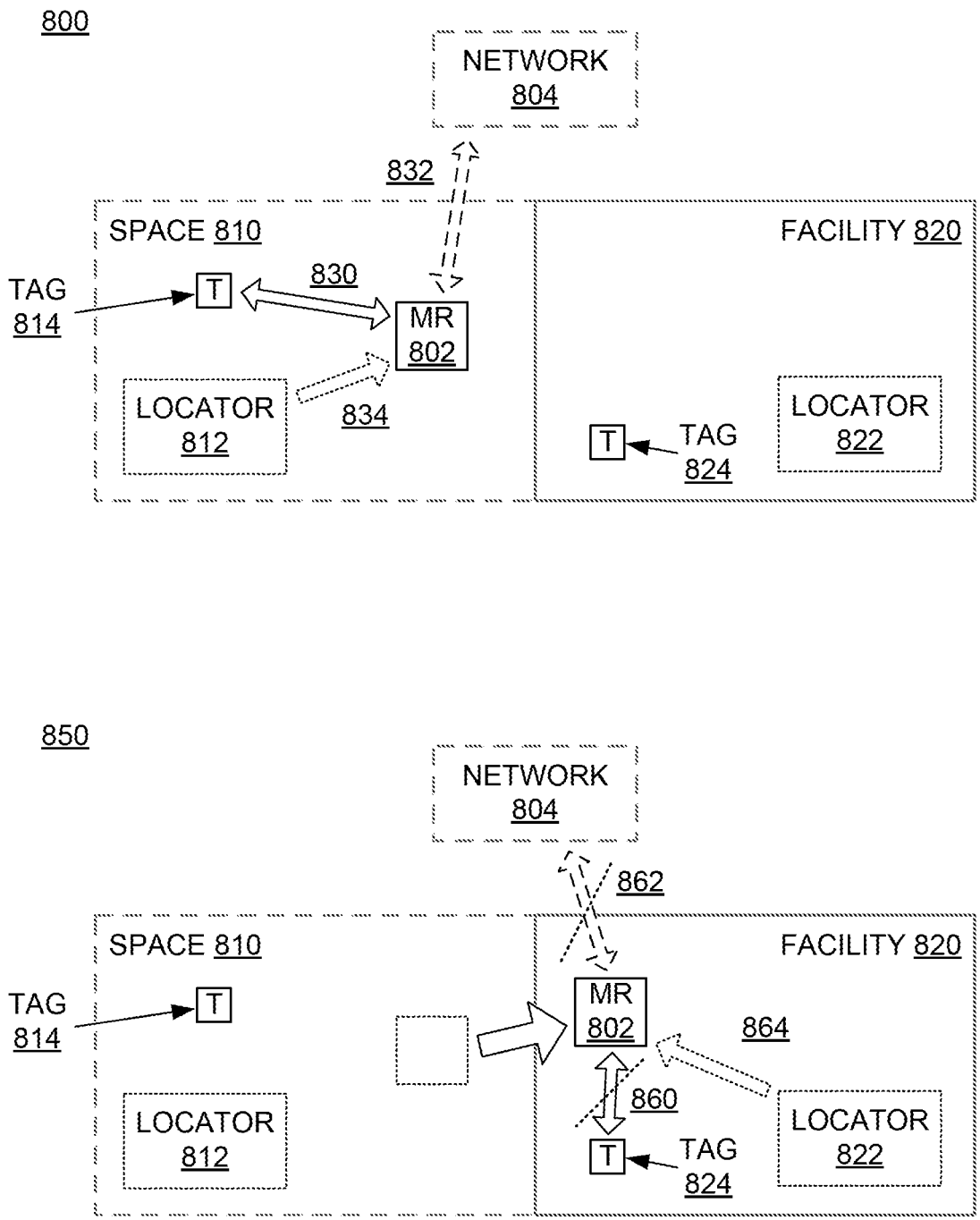
FIG. 8 illustrates how access to tag information may be controlled based on location, according to embodiments.

FIG. 8 illustrates how access to tag information may be controlled based on location, according to embodiments. FIG. 8 depicts a space 810 adjoining a facility 820, each of which may represent part or all of a facility such as a building, yard, retail store, laboratory, warehouse, construction facility, plant, military base, airport, ship, parking lot, shipping container, or may represent an outdoor space such as a park, a fairground, an athletic field, a street, a driveway, a sidewalk or path, or a portion or section of the above, a location within or associated with one of the above, or similar. FIG. 8 also depicts tag 814, mobile reader 802 configured to engage with tags, and optional network 804 in communication with mobile reader 802.

Mobile reader 802 may be a handheld RFID reader, or may be an RFID reader module integrated into another device, such as a smartphone, a portable computer (e.g., laptop, tablet, wearable computer, etc.), a wearable device, a manual or autonomous vehicle (e.g., a car, an airplane, a drone, etc.). Mobile reader 802 may be configured to determine whether access to tag information is restricted based on one or more variables, factors, or parameters. For example, mobile reader 802 may use location information to determine whether access to tag information is restricted based on location. Tag information access may be restricted at the level of mobile reader 802 and/or at the level of a requester that requests and receives information from mobile reader 802. Tag information access restrictions at the level of mobile reader 802 may govern whether mobile reader 802 is allowed to or able to engage with RFID tags at a particular location, or whether mobile reader 802 is allowed to receive tag information associated with a particular location from other sources. Tag information access restrictions at the level of the requester may govern whether tag information associated with a particular location and/or particular tags, whether from mobile reader 802 or from another source, can be provided to the requester. The requester may include any entity controlling, providing commands to, and/or receiving information from mobile reader 802. For example, the requester may be an individual in possession of mobile reader 802 and/or a device coupled to mobile reader 802.

In diagram 800, mobile reader 802 is present in space 810 and within range of tag 814. In one embodiment, mobile reader 802 may determine (a) whether location-based tag information access restrictions exist at its level (i.e., at the reader level) and (b) whether it is authorized to engage tags before inventorying tag 814 or any other tags. In another embodiment, mobile reader 802 may inventory (830) or otherwise engage tag 814, but before sending information about tag 814 to a requester may determine (a) whether location-based tag information access restrictions exist at the requester level and (b) whether the requester is authorized to access tag information.

In both embodiments, mobile reader 802 may first determine location information, which may include the location of mobile reader 802, the location of a device or user associated with mobile device 802, and/or the location of tag 814. Mobile reader 802 may be configured to determine its location, for example via a global navigation system such as GPS or GLONASS, mobile device tracking, indoor positioning systems such as a Wi-Fi positioning system, or any other suitable localization system. In some embodiments, mobile reader 802 may communicate (834) with an optional locator 812 to determine its location and/or the location of tag 814. Locator 812 may include an infrastructure tag or marker tag (e.g., an RFID tag associated with a physical location or fixture in space 810), a radio or RF emitter associated with space 810, or any other means of providing location information.

Mobile reader 802 may then use the determined location information to determine whether tag information access restrictions exist. In some embodiments, mobile reader 802 stores tag information access restriction information about spaces, facilities, and areas (collectively referred to as "spaces") that indicate whether reader-level or requester-level tag information access restrictions exist for those spaces and identify readers and/or entities authorized to access tag information associated with those spaces. Mobile reader 802, upon determining location information, may use the location information and the tag information access restriction information to determine whether tag information access restrictions exist at that location. If so, mobile reader 802 may then determine whether it and/or a requester requesting tag information from mobile reader 802 is authorized to access tag information at that location. For example, mobile reader 802, upon determining that reader-level restrictions exist, may determine whether mobile reader 802 is authorized to engage with tags in that location before engaging with tags. As another example, mobile reader 802 may determine whether a requester is authorized to access tag information at that location upon determining that requester-level restrictions exist at that location before forwarding (e.g., sending to the requester) information about tags in that location.

Mobile reader 802 may also (or instead) contact another entity to determine whether tag information access restrictions exist and whether mobile reader 802 or a requester is authorized to access tag information. For example, mobile reader 802 may communicate (832) with network 804 to determine whether tag information access restrictions for particular locations exist. In some embodiments, mobile reader 802 may provide location information to network 804. Network 804 knows or has access to tag information access restriction information, and can determine whether mobile reader 802 and/or its associated requester is within a restricted space and therefore will require authorization to engage tags. Upon determining whether reader-level or requester-level restrictions exist, network 804 may inform mobile reader 802 accordingly. For example, if network 804 determines that reader-level or requester-level restrictions exist at the location of mobile reader 802, network 804 may send a message to mobile reader 802 or its associated requester indicating that access to tag information at that location is restricted. Network 804 and/or mobile reader 802 may then determine whether mobile reader 802 and/or its associated requester is authorized to access tag information at that location. In some embodiments, network 804 may be able to authorize mobile reader 802 and/or an associated requester to engage with tags or to receive tag information, for example based on identifying and authentication information associated with mobile reader 802 and/or the requester.

In some embodiments, mobile reader 802 may also send information about engaged tags to network 804. In these situations, network 804 may process the received information based on network-level tag information access restrictions that govern whether a network or network server is allowed to receive, store, and/or provide tag information. For example, network 804 may not be allowed to receive, store, and/or provide tag information associated with particular locations or particular tags. If network 804 receives tag information associated with those locations or tags from a reader or device, network 804 may discard the received tag information and/or send a message to the reader or device indicating that the tag information is restricted. In some embodiments, network 804 may store the received tag information but indicate that access to the tag information is restricted. For example, network 804 may store the received tag information in a local or network database, and may also store data associated with the stored tag information indicating that access to the stored tag information is restricted to authorized entities.

Suppose that either no restrictions exist or mobile reader 802 and its associated requester are authorized to engage with tags associated with space 810. Mobile reader 802, after determining that no restrictions exist or that it is authorized, may then inventory (830) tag 814 and send information about tag 814 to the requester. The information about tag 814 or other tags in a space may include a tag identifier, an item identifier identifying a tagged item, a tag key, tag-stored data, a uniform resource locator (URL) identifying a location or address on a network (e.g., the Internet) where information about the tag or its associated item can be found, or any other suitable tag information. Mobile reader 802 may also send the information about tag 814 to network 804. Upon determining that no network-level tag information access restrictions exist, network 804 may store information indicating that tag 814 was read by mobile reader 802 in space 810 at a particular time. Network 804 may store the information at a local or remote database, and may also make the information accessible to authorized entities by posting the information at a network location accessible via a URL, where the URL may be based on an identifier of tag 814 and/or its associated item. In some embodiments, mobile reader 802 and/or an associated requester may request additional information about tag 814 from network 804. Such additional information may include information about an item associated with tag 814, a history of tag 814 and/or the item, a URL associated with the tag or the item, and/or any other information about tag 814 or its associated item that cannot be retrieved directly from tag 814.

Diagram 850 depicts a situation in which mobile reader 802 has transitioned from space 810 to facility 820, which includes tags such as tag 824. Facility 820, unlike space 810, has reader-level, requester-level, and/or network-level tag restrictions that apply to mobile reader 802, the requester associated with mobile reader 802, and/or network 804. In this situation, mobile reader 802 may first determine location information, as described above, before inventorying tag 824. For example, mobile reader 802 may communicate (864) with locator 822, which may be similar to locator 812 in functionality. Mobile reader 802 may then use the location information to determine whether tag information access restrictions exist for facility 820, either using locally-cached information (e.g., tag information access restriction information stored at mobile reader 802) or information accessible via network 804.

If mobile reader 802 is able to determine that tag information access restrictions exist for facility 820, then mobile reader 802 may proceed accordingly. Suppose that mobile reader 802 determines that reader-level access restrictions exist for facility 820 and mobile reader 802 is not authorized to engage with tags in facility 820. In this case, mobile reader 802 may refrain from engaging with tag 824 or other tags within facility 820, for example by refraining from initiating and/or completing inventorying of the tags. Mobile reader 802 may refrain from engaging with tags by disabling transmit and/or receive capabilities of mobile reader 802 (e.g., by physically disconnecting or virtually decoupling components such as antennas and modulators/demodulators), disabling one or more logical functionalities of mobile reader 802 (e.g., preventing the modulation/demodulation, encoding/decoding, and/or processing of RF signals) and/or disabling some other capability of mobile reader 802. Mobile reader 802 may inform an associated requester that tag information access restrictions exist and/or that mobile reader 802 cannot provide tag information to the requester.

Suppose that mobile reader 802 determines it is authorized to engage with tags in facility 820 but that requester-level access restrictions exist for facility 820 and that the requester associated with mobile reader 802 is not authorized to receive tag information associated with facility 820. In this case, mobile reader 802 may either refrain from engaging with tags or may proceed to engage with tags. For example, mobile reader 802 may inventory (860) tag 824. In either case, mobile reader 802 may refrain from sending replies received from inventoried tags or data included in received tag replies to the requester. Mobile reader 820 may also inform an associated requester that tag information access restrictions exist, that the requester is not authorized to engage with tags in that location, and/or that mobile reader 820 cannot provide tag information to the requester.

Suppose that mobile reader 802 determines that network-level access restrictions exist for facility 820, for example via communication with network 804, and that network 804 is not authorized to receive and/or store tag information associated with facility 820. In this case, mobile reader 802 may provide (862) or refrain from providing tag information to network 804. For example, mobile reader 802 may refrain from providing tag information to network 804 because network 804 is not authorized. As another example, mobile reader 802 may provide tag information to network 804 and rely on network 804, which presumably knows its authorization status, to refrain from accepting tag information due to its authorization status. Regardless, in this situation mobile reader 802 may engage with tags or refrain from engaging with tags and may provide or refrain from providing tag information to an associated requester, depending on whether reader-level and requester-level restrictions exist and whether mobile reader 802 and its associated requester are authorized to engage tags and receive tag information.

In some situations, a requester associated with a mobile reader may encounter different reader-level, requester-level, and network-level restrictions and authorizations. For example, in one case the mobile reader may be authorized to engage tags but the requester may not be authorized to access tag information, and in another case the requester may be authorized to access tag information but the mobile reader may not be authorized to engage tags. In these cases, the authorized entity may be able to authorize the unauthorized entity to engage tags and/or access tag information. For example, the authorized entity may be able to use its credentials or identifier to secure authorization for the unauthorized entity. In some embodiments, the authorized entity may contact a network to secure authorization for the unauthorized entity.

If mobile reader 802 is unable to determine whether tag information access restrictions exist, then mobile reader 802 may operate according to a default tag information access policy. For example, the default tag information access policy for mobile reader 802 may be that no access restrictions exist. As another example, the default tag information access policy for mobile reader 802 may be that mobile reader 802, the requester associated with mobile reader 802, and/or network 804 are not authorized to inventory tags and/or receive tag information associated with facility 820. In some embodiments, the default tag information access policy for mobile reader 802 may be represented as specific locations, where different locations have different tag information access policies. For example, mobile reader 802 may have a default tag information access policy corresponding to a "public" or "outside" location, where no access restrictions exist. As another example, mobile reader 802 may have a default tag information access policy corresponding to a "private" or "home" location, where reader-level, requester-level, and network-level restrictions exist.

In diagram 850, network 804 may also operate based on known tag information access restrictions for facility 820. If network 804 determines that reader-level or requester-level access restrictions exist for facility 820, network 804 may refrain from providing tag information to unauthorized readers and/or associated requesters. For example, if mobile reader 802 requests additional information about tag 824, network 804 may determine that mobile reader 802 is not authorized to engage with tags in facility 820, refrain from providing the additional information, and transmit a message indicating that mobile reader 802 is not authorized to receive the additional information and/or engage with tags in facility 820. If network 804 determines that network-level access restrictions exist for facility 802 and network 804 is not authorized to access tag information associated with facility 802, network 804 may discard or segregate received tag information associated with facility 802. For example, if mobile reader 802 sends information about tag 824 to network 804, network 804 may discard the tag information or store the tag information but indicate that access to the stored tag information is restricted. Network 804 may indicate that access is restricted by flagging the information, storing the information in a specific memory region, database, or database portion, obfuscating the information using a cryptographic or other algorithm, requiring authentication from an entity before providing the entity access to the information, or any other method of indicating that access to the information is restricted.

Location-based tag information access restrictions may be generated in a number of ways. In one embodiment, all spaces may default to having reader-level, requester-level, and network-level restrictions, and the owning or controlling entity of a particular space may "opt-in" by relaxing one or more restrictions for one or more readers, requesters, and/or networks, or by removing one or more restrictions entirely. For example, the owning/controlling entity of a space may authenticate itself to a network such as network 804 to indicate that it actually owns and/or controls the space. Upon authentication, the entity can then set or adjust tag information access restrictions for the space. Subsequently, the network may propagate the new tag information access restrictions to different networks, readers, and/or requesters. In another embodiment, all spaces may default to having no restrictions, and the owning or controlling entity of a particular space may "opt-out" by instituting reader-level, requester-level, and/or network-level restrictions.

In some embodiments, location-based tag information access restrictions may also (or instead) be based upon location within a particular space, tag identity, reader identity, requester identity, network identity, or any other suitable factor. For example, a particular space may have no restrictions associated with tags within a particular section of the space, but may have restrictions associated with tags within a different section of the space. As another example, a particular space may have no restrictions for particular types of tags (e.g., tags associated with particular types or categories of items, having particular features, or having particular identifiers), but may have restrictions for other types of tags. As yet another example, a particular space may have no tag information access restrictions for particular readers, types or readers, requesters, and/or types of requesters, but may have tag information access restrictions for other readers or requesters. In any of these cases, a suitably authorized reader, requester, or network may be able to access tag information, even if otherwise restricted.

In some embodiments, a mobile reader may be configured to only forward information associated with a tag that has been authenticated. For example, suppose that the mobile reader has determined that it is authorized to engage tags in a particular location. While engaging a particular tag, the mobile reader may attempt to authenticate the tag, for example to verify that the tag has a particular identity or particular properties. In some embodiments the mobile reader may authenticate the tag using a challenge-response interaction as described in the Gen2 Specification, although any suitable authentication scheme may be used to authenticate the tag. The mobile reader may be able to perform the authentication itself, or may communicate with another entity such as a coupled device or a network to perform the authentication. For example, the mobile reader may store or know some secret information about the tag that the mobile reader can use to authenticate the tag. As another example, the mobile reader may transmit a cryptographically-secured (e.g., encrypted or electronically-signed with a key) to a verification authority for authentication. Upon determining that the tag is authentic, the mobile reader may then proceed to forward tag information to a requester, forward tag information to a network, request additional tag information, or perform any other suitable action associated with the tag. However, if the mobile reader determines that the tag is not authentic, then the mobile reader may not forward tag information to the requester or the network. In some embodiments, the mobile reader may notify the requester and/or the network that a potentially counterfeit tag has been discovered.

Figure 9:
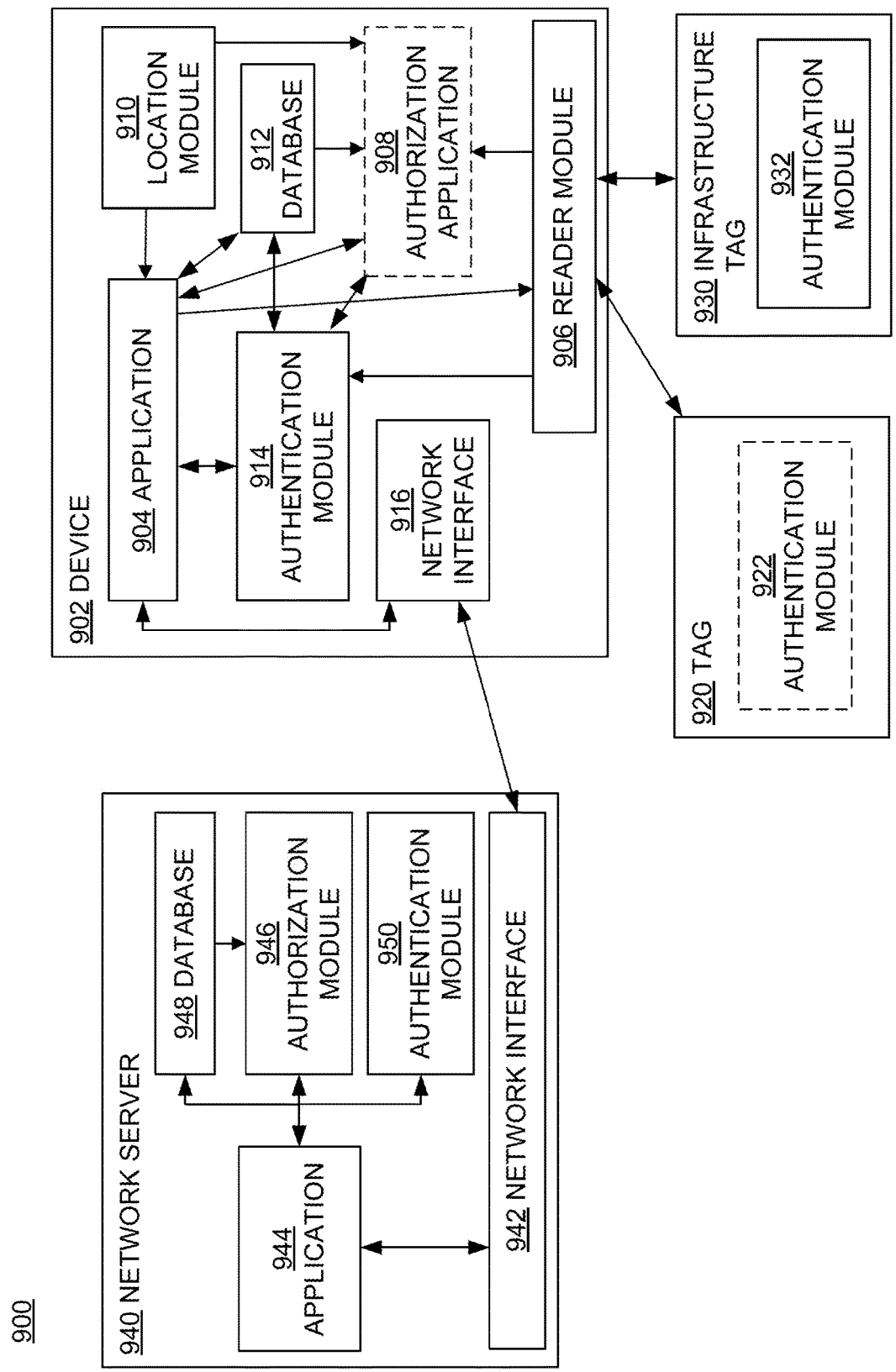
FIG. 9 depicts how device access to tag information may be controlled based on interactions with tags and a network server, according to embodiments.

FIG. 9 depicts how device access to tag information may be controlled based on interactions with tags and a network server, according to embodiments.

Diagram 900 depicts a device 902 configured to inventory a tag 920 and a infrastructure tag 930 and communicate with a network server 940. Device 902 may be a mobile device as described above, or may be a stationary or fixed device. Device 902 may include or implement an application 904, a reader module 906, an authorization application 908, a location module 910, a database 912, an authentication module 914, and an authentication module 914, each of which may be able to communicate with every other component.

Application 904 may be configured to receive tag information from reader module 906 and use the tag information, in conjunction with data received from any other component of device 902, to perform some action. For example, application 904 may receive a tag identifier from reader module 906, use the tag identifier to retrieve information about an associated item from database 912 and/or network server 940 via network interface 916, and present the retrieved information to a user of device 902. Application 904 may be software or firmware that executes on a physical processor or controller of device 902, or may be implemented as hardware at device 902, for example as an application-specific integrated circuit (ASIC) or similar.

Reader module 906 is configured to allow another component, such as an external device, processor, controller, or application (e.g., application 904) to send data to and receive data from RFID tags, and may implement a transceiver module, an interface module, and a processor module. The transceiver module may be configured to transmit RF signals intended for RFID tags and receive RF signals encoding data from RFID tags. The interface module may be configured to couple to components and may receive information associated with RFID tag interactions from the components and/or send information associated with RFID tags to the components. The processor module may be coupled to the transceiver module and the interface module, and may be configured to control the behavior of reader module 906. For example, the processor module may receive requests for tag inventorying or tag information from the interface module, determine whether the requests are appropriate or authorized, convert the requests into control signals for the transceiver module, and/or send the control signals to the transceiver module. As another example, the processor module may receive tag information gathered by the transceiver module, determine whether the tag information should be send to a requester or external entity, convert the tag information into a suitable format, and/or send the converted or unconverted tag information to the interface module.

Authorization application 908 may be configured to determine whether device 902 and/or application 904 are authorized to access tag information, for example by instructing reader module 906 to inventory RFID tags and/or forward data received from inventoried RFID tags. Authorization application 908 may be configured to determine authorization based on location information from location module 910, locally-cached or stored tag information access restriction information from database 912, tag identifiers from reader module 906, application information from application 904, authentication information from authentication module 914, and/or access restriction information from network server 940 via network interface 916. For example, authorization application 908 may determine a location of device 902 based on, for example, information from location module 910. Authorization application 908 may then determine whether any tag information access restrictions for the determined location exists, for example based on information from database 912 and/or network server 940. If restrictions exist, authorization application 908 may then determine whether device 902 or application 904 is authorized to engage with tags despite the restrictions. For example, authorization application 908 may determine whether device 902/application 904 meet criteria for being authorized, whether some prior indication of authorization is known to device 902/application 904 (for example, stored in database 912), whether the network server 940 indicates that device 902/application 904 is authorized, or any other suitable method to determine the authorization status of device 902/application 904.

In some embodiments, authorization application 908 may be able to secure authorization for device 902/application 904, for example in conjunction with authentication module 914. In these embodiments, authorization application 908 and/or authentication module 914 may communicate with network server 940 to secure authorization for device 902/application 904, by transmitting appropriate identifiers and authorizing information. Authorizing information may include cryptographically-secured information, and authentication module 914 may be configured to perform cryptographic operations using one or more secret or private keys associated with device 902 and/or application 904.

Location module 910 may be configured to provide location information about the device 902, for example using global navigation systems, mobile device tracking, indoor positioning systems, or any other suitable localization system. In some embodiments, location module 910 may be configured to communicate with a locator, similar to locator 812 described above, in order to determine location information.

Database 912 may store tag information access restriction information, previously-received tag information associated with tag 920, infrastructure tag 930, and/or other tags, information associated with application 904, key information associated with device 902 and/or application 904, or any other suitable information. Authenticating module 914, as described above, may authenticate device 902 and/or application 904 to an external entity, or may authenticate external entities to device 902/application 904. Network interface 916 is configured to communicate with devices external to device 902, such as network server 940, and to relay information between external devices and components in device 902. Network interface 916 may communicate with external devices using any suitable wired or wireless scheme.

Device 902 (or more specifically reader module 906) may communicate with tag 920 and infrastructure tag 930. Tag 920 is an RFID tag, and may be configured to receive commands from device 902, execute the commands if appropriate, and respond accordingly. Tag 920 may implement an authentication module 922, similar to authentication module 914, which may be used to authenticate tag 920 to device 902 and vice-versa. Infrastructure tag 930 is similar to tag 920, but may provide additional locator functionality, similar to locator 812 described above. For example, infrastructure tag 930 may transmit a message to device 902 indicating a location of infrastructure tag 930 and/or device 902. In some embodiments, infrastructure tag 930 implements an authentication module 932, similar to authentication modules 922 and 914.

Authentication module 932 may be used to authenticate infrastructure tag 930 to device 902 and vice-versa. In some embodiments, authentication module 932 may be used to form a cryptographically-secured message based on a secret or private identifier or key associated with infrastructure tag 930. The cryptographically-secured message may then be sent to device 902, which in turn may then forward the cryptographically-secured message to network server 940. Network server 940 may be able to authenticate the cryptographically-secured message, thereby verifying that device 902 is located in a particular location (e.g., near or within range of infrastructure tag 930).

Network server 940 may include or implement network interface 942, application 944, authorization module 946, database 948, and authentication module 950, each of which may be similar to their corresponding counterparts in device 902. Application 944 may be configured to receive tag information and requests for tag information from devices such as device 902. Application 944 may then use authorization module 946 to determine whether network server 940, application 944, and/or the requesting devices are authorized to access tag information. Authorization module 946 may use information from database 948 and/or location information received from the requesting devices to determine authorization. Database 948 may store information about tags and tag access restrictions. In some embodiments, database 948 may associate particular tag information with particular access restrictions. Authentication module 950 may be configured to authenticate network server 940/application 944 to external devices or vice-versa, similar to authentication modules 914, 922, and 932. In some embodiments, authentication module 950 may be configured to verify a cryptographically-secured message from a beacon or an infrastructure tag such as infrastructure tag 930, thereby verifying that a particular device is at a particular location.

Figure 10:
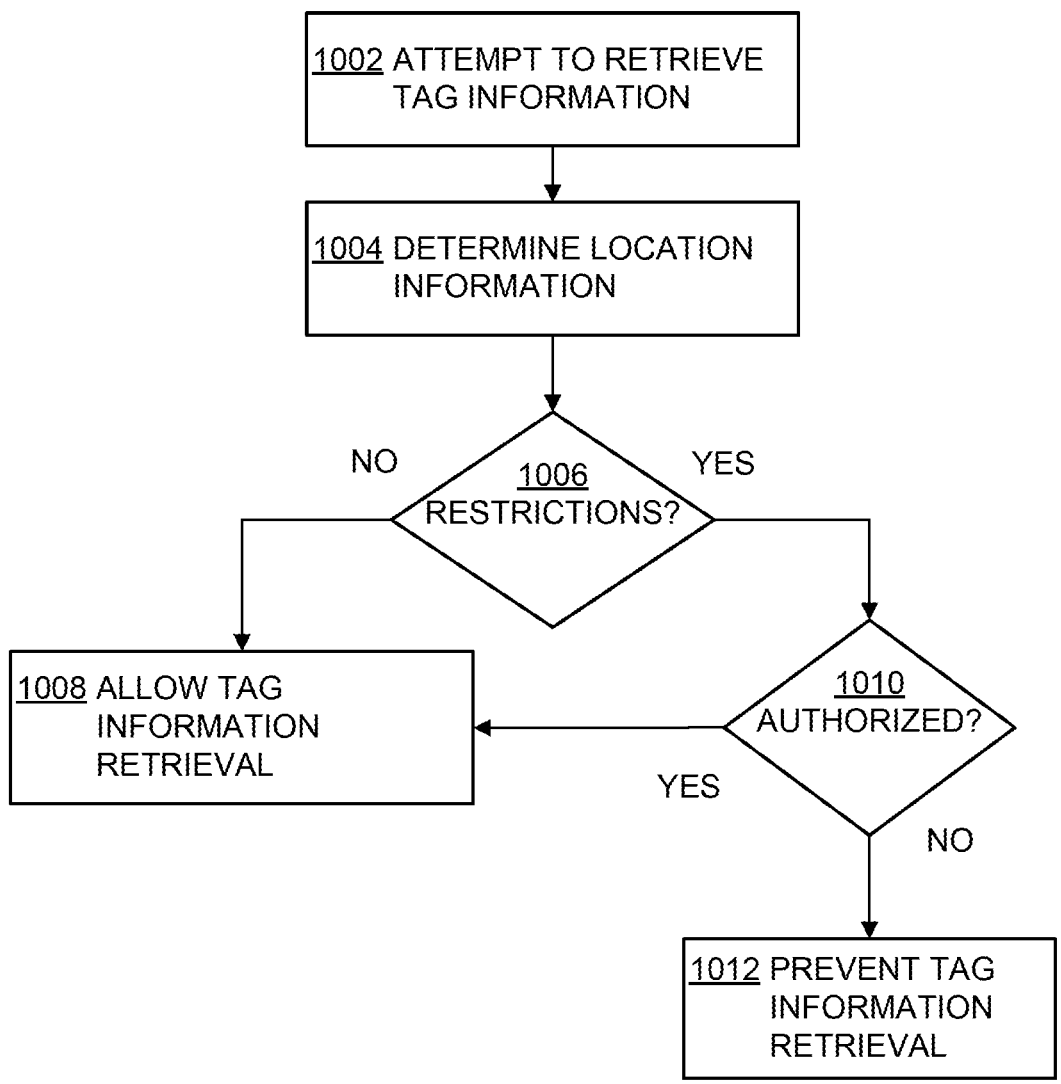
FIG. 10 depicts a process for device-based tag information access control according to embodiments.

FIG. 10 depicts a process 1000 for device-based tag information access control according to embodiments. Process 1000 begins at step 1002, when an application (e.g., application 904) executing or implemented on a device attempts to retrieve information about an RFID tag. For example, the application may request that the device or a reader module of the device inventory and retrieve information from the tag. At step 1004, the application or associated device components (e.g., a reader module, a location module, and/or an authorization module) determines location information associated with the device and/or the tag. For example, the location information may identify a location for the device and/or the tag. At step 1006, an authorization module may determine whether restrictions exist for tag information access at that location. For example, the authorization module may determine whether reader-level or requester-level restrictions associated with that location exists. For example, the authorization module may identify restrictions based on locally-cached restriction information and/or remotely-accessible (e.g., on a network) restriction information. If the authorization module determines that no restrictions exist, then at step 1008 the authorization module allows the tag information retrieval. For example, the authorization module may allow the reader module to inventory the tag, receive data from the tag, and forward the received data to the application.

If at step 1006 the authorization module determines that restrictions exist for tag information access at that location, then at step 1010 the authorization module may determine whether the application or an associated device (e.g., a reader module) is authorized to access tag information at that location. For example, the authorization module may determine whether an identifier associated with the application and/or device is on a list of authorized identifiers, or the authorization module may engage in interactions with an authorization entity to determine whether the application and/or device is authorized. If the authorization module determines that the application and device are authorized to access tag information at that location, the authorization module allows the tag information retrieval at step 1008. On the other hand, if the authorization module determines that the application and device are not authorized to access tag information at that location, at step 1012 the authorization module may prevent the tag information retrieval. For example, the authorization module may cause the reader module to be disabled in part or entirely, may interrupt the inventorying process, and/or may prevent the reader module from forwarding data retrieved from the tag to the application. In some embodiments, the authorization module may attempt to secure authorization for the application and the device to access tag information, as described above.

Figure 11:
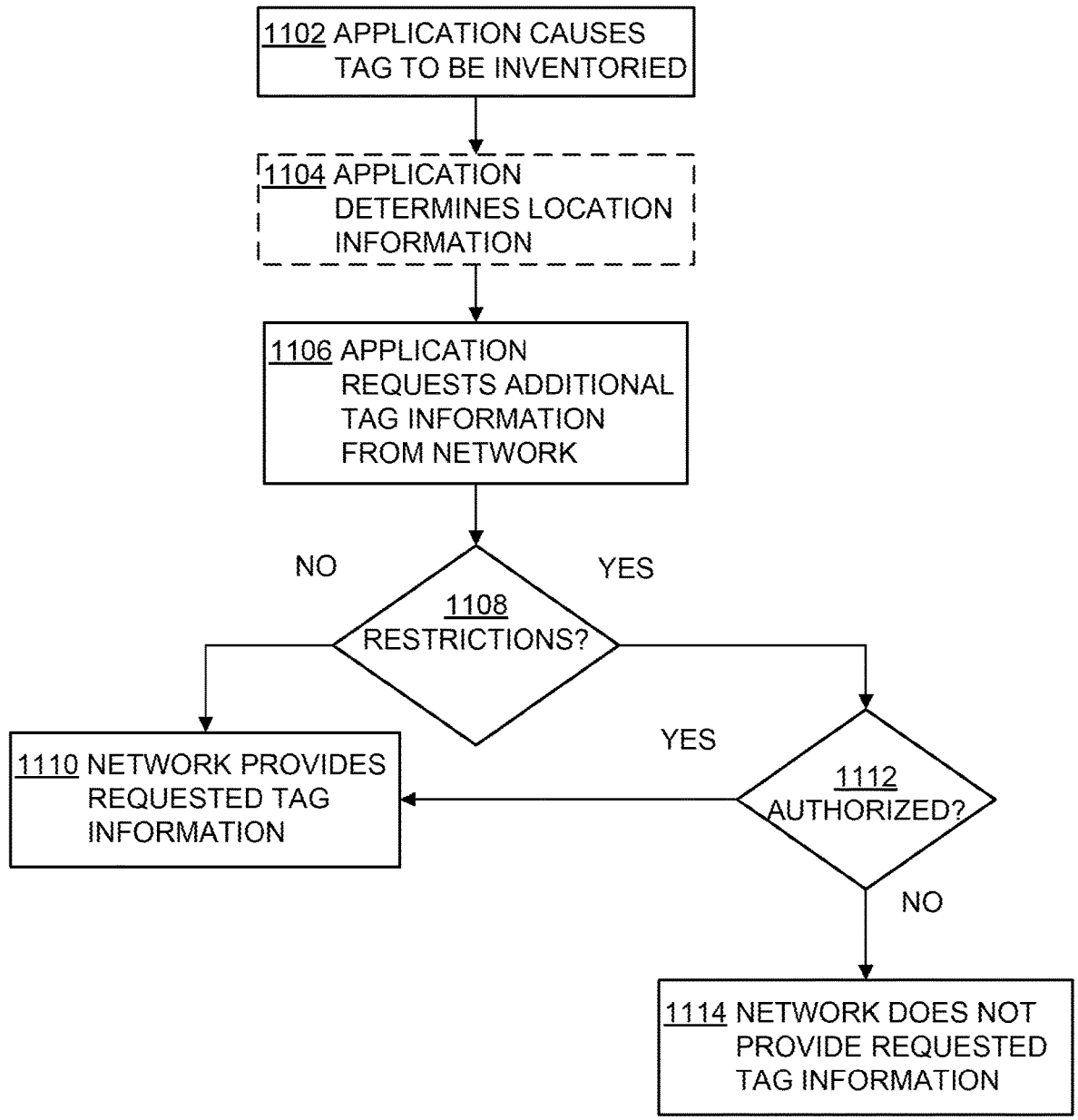
FIG. 11 depicts a process for network-based tag information access control according to embodiments.

FIG. 11 depicts a process 1100 for network-based tag information access control according to embodiments. Process 1100 begins at step 1102, when an application associated with a device causes an RFID tag to be inventoried, thereby retrieving some information about the tag (for example, a tag or item identifier). At optional step 1104, the application may determine location information associated with its associated device and/or the tag, similar to step 1004 of process 1000. At step 1106, the application requests additional information about the tag from a network or network server. For example, the application may request a history of the tag or information about an item associated with the tag. In some embodiments, the application sends the location information determined in step 1104 to the network along with the request. At step 1108, the network determines whether restrictions exist for tag information access at the location of the device and/or tag. For example, the network may have access to stored location-based restriction information, and may use the location information sent by the application to determine whether restrictions exist. In some embodiments, the network may independently determine the location of the device or application, for example via network addresses or similar. If at step 1108 the network determines that no restrictions exist for tag information access at that location, then at step 1110 the network may provide the requested tag information to the application. For example, the network may provide the requested tag information directly to the application, or the network may provide a URL or other locator that leads to a network location that contains the requested tag information.

On the other hand, if at step 1108 the network determines that restrictions exist for tag information access at that location, then at step 1112 the network determines whether the application or device is authorized to access tag information associated with that location, similar to step 1010 of process 1000. If the network determines that the application or device is authorized to access tag information associated with that location, the network may provide the requested tag information at step 1110. On the other hand, if the network determines that the application or device is not authorized to access tag information associated with that location, at step 1114 the network does not provide the requested tag information. The network may ignore the request, or may respond with a message indicating that access to tag information is restricted and/or that the application is not authorized to access the requested tag information. In some embodiments, the network may attempt to secure authorization for the application or device to access the requested tag information.

Figure 12:
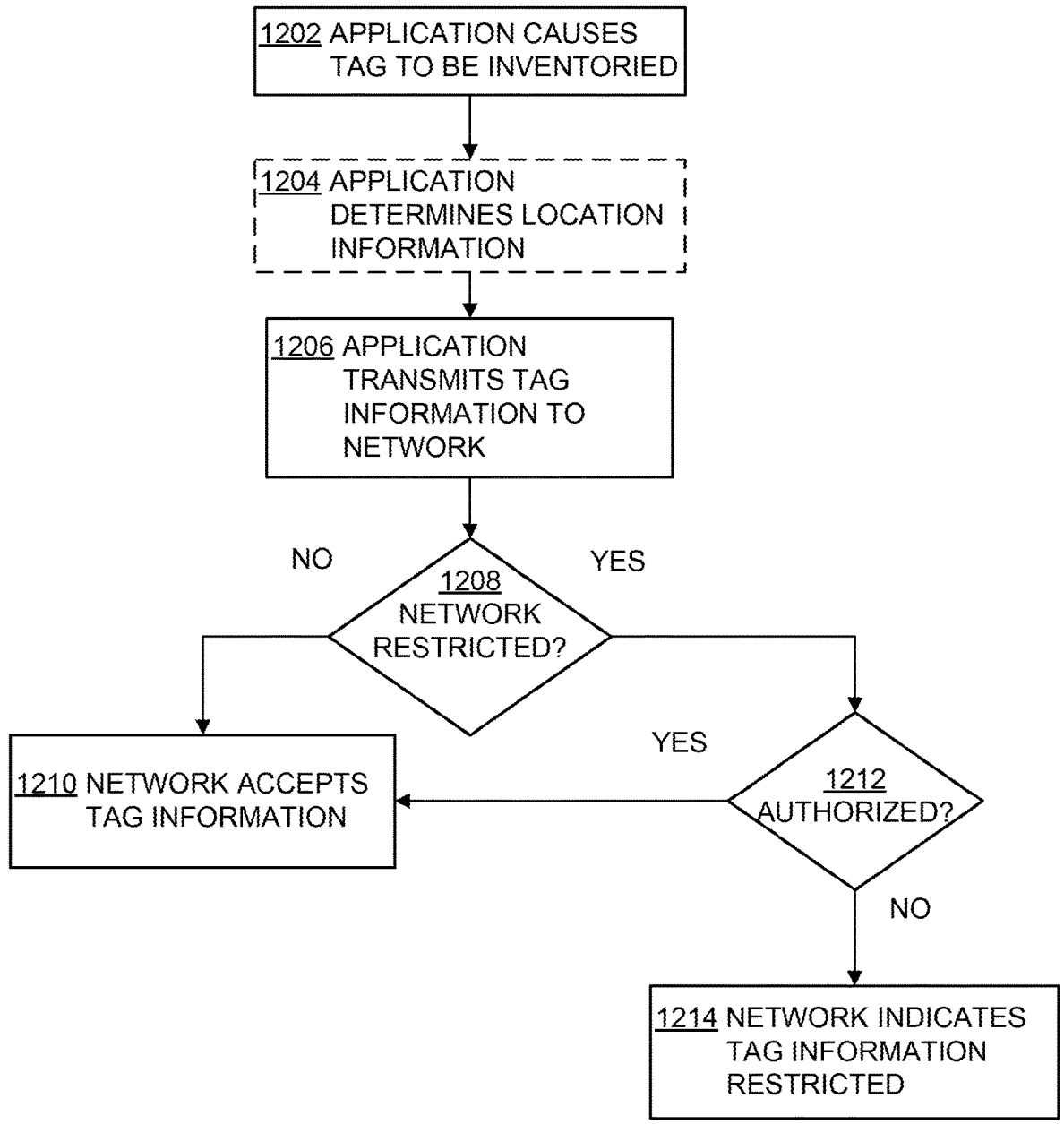
FIG. 12 depicts another process for network-based tag information access control according to embodiments.

FIG. 12 depicts another process 1200 for network-based tag information access control according to embodiments. Process 1200 begins at step 1202, when an application associated with a device causes an RFID tag to be inventoried, thereby retrieving some information about the tag (for example, a tag or item identifier). At optional step 1204, the application may determine location information associated with its associated device and/or the tag, similar to steps 1104 and 1004 of processes 1100 and 1000. At step 1206, the application may transmit the retrieved tag information to a network. For example, the application may transmit any retrieved tag or item identifiers along with timestamps, location indicators, information about nearby tags, or any other suitable information. At step 1208, the network determines whether restrictions exist for tag information access at the location of the device and/or tag, similar to step 1108 of process 1100. If at step 1208 the network determines that no restrictions exist for tag information access at that location, then at step 1210 the network may accept the tag information. For example, the network may store the tag/item identifiers and associated data in a database. In some embodiments the network stores the received tag information and makes it available to other requesters without any restrictions. In other embodiments the network may restrict access to the received tag information only to authorized requesters.

On the other hand, if at step 1208 the network determines that restrictions exist for tag information access at that location, then at step 1212 the network may determine whether it is authorized to access tag information associated with that location, similar to steps 1010 and 1112 of processes 1000 and 1100. If the network determines that it is authorized to access tag information associated with that location, then the network may accept the tag information at step 1210. On the other hand, if the network determines that it is not authorized to access tag information associated with that location, then at step 1214 the network indicates that the tag information is restricted. The network may indicate that the tag information is restricted by discarding the tag information received from the application and optionally transmitting a message to the application indicating that the network is not authorized to accept tag information associated with that location. In some embodiments, the network may store the received tag information, but may somehow indicate that access to the stored tag information is restricted. For example, the network may store data associated with the stored tag information indicating that access to the stored tag information is restricted, or may store the data in a restricted-access database or memory location.

While the tag information access restrictions above are primarily described as being location-based, determination of tag information access restrictions and authorizations may be performed based on other variables or parameters. Such parameters may include identity (of a network, requester, device, tag, owning entity, supervisory body, governmental body, etc.), time, date, geographic locale, legal restrictions, density (of requesters, devices, tags, etc.), jurisdiction, and/or any other suitable parameter. In these cases, According to some examples, a method for an RFID reader to restrict access to RFID tag information based on reader location is provided. The method includes determining the reader is in a first location, receiving a first request for first tag information while the reader is in the first location, determining that the reader is not authorized to engage tags in the first location, and refraining from responding to the first request with the first tag information. The method further includes determining the reader is in a second location different from the first location, receiving a second request for second tag information while the reader is in the second location, determining that the reader is authorized to engage tags in the second location, retrieving the second tag information, and responding to the second request with the second tag information.

According to some embodiments, the method may further include determining a location of the reader based on a global navigation system, an indoor positioning system, a beacon, an infrastructure tag, and location information from a coupled device. Determining the reader is in the first position may include not being able to determine a reader location. Determining that the reader is not authorized to engage tags in the first location and/or determining that the reader is authorized to engage tags in the second location may include determining restricted-location information and determining whether the reader is authorized to engage tags in the first and second locations based on the restricted-location information. Determining the restricted-location information may include receiving the restricted-location information from a network server and/or a local cache, or may be based on a beacon and/or an infrastructure tag associated with the first and/or second location. Refraining from responding with the first tag information includes disabling a transmit capability and/or receive capability of the reader, disabling a logical functionality of the reader, refraining from forwarding received tag data, and/or responding with a message indicating that the reader is not authorized to engage tags.

According to other examples, a method to restrict RFID tag information based on location is provided. The method includes receiving first tag information from a reader system, determining that the reader system is in a first location, determining that the reader system is not authorized to engage tags in the first location, and indicating that the first tag information is restricted in response to determining that the reader system is not authorized to engage tags in the first location. The method may further include receiving second tag information from the reader system, determining that the reader system is in a second location different from the first location, determining that the reader system is authorized to engage tags in the second location, and indicating that access to the second tag information is authorized in response to determining that the reader system is authorized to engage tags in the second location.

According to some embodiments, determining that the reader system is in the first location may include not being able to determine a location of the reader system. Determining that the reader system is in the first or second location may include receiving a message sent by a location marker from the reader system and verifying that the location marker is associated with the first or second location based on the cryptographically-secured message. The method may further include determining that the reader system is located in the first and/or second locations using restricted-location information, an identifier for the reader system, an identifier for a user of the reader system, a message from a tag, and/or a cryptographically secured message from the reader system. Indicating that the first tag information is restricted may include discarding the first tag information, storing the first tag information while indicating that access to the first tag information is restricted, sending a message to the reader system indicating that the first tag information is restricted, and/or sending a message to the reader system indicating that the reader system is not authorized to engage tags in the first location. Indicating that access to the second tag information is authorized may include sending additional information associated with the second tag information to the reader system.

According to further examples, an RFID reader configured to restrict access to RFID tag information based on reader location is provided. The reader includes an interface module configured to receive requests for tag information, a transceiver module configured to transmit commands to and receive information from RFID tags, and a processor module. The processor module may be configured to receive a first request for first tag information while the reader is in a first location from the interface module, determine that the reader is not authorized to engage tags in the first location, and refrain from responding to the first request with the first tag information. The processor module may be further configured to receive a second request for second tag information while the reader is in a second location different from the first location from the interface module, determine that the reader is authorized to engage tags in the second location, retrieve the second tag information via the transceiver module, and respond to the second request with the second tag information.

According to some embodiments, the reader may further include a location module configured to determine a location of the reader based on a global navigation system, an indoor positioning system, a beacon, an infrastructure tag, and/or location information from a coupled device, and provide the determined location to the processor module. The location module may be configured to determine that the reader is in the first location in response to determining that the location of the reader cannot be determined. The processor module may be further configured to determine restricted-location information and determine whether the reader is authorized to engage tags in the first and second locations based on the restricted-location information. In some embodiments, the processor module may be configured to receive the restricted-location information from a network server and/or a local cache, or may be configured to determine the restricted-location information based on a beacon and/or an infrastructure tag, each associated with the first and/or second location. The processor module may be configured to refrain from responding with the first tag information by disabling the transceiver module, preventing the transceiver module from transmitting inventorying commands and/or receiving replies, refraining from forwarding received tag data, and/or responding with a message indicating that the reader is not authorized to engage tags.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A network application executed on one or more machines, the network application configured to restrict access to Radio Frequency Identification (RFID) tag information based on requester location and cause a machine to:

receive, through a network interface of the machine, a first request for first tag information from a requester while the requester is in a first location, wherein the requester is a device with an RFID reader module or an RFID reader;

determine, at the machine, that the requester is not authorized, in the first location, to receive the first tag information;

refrain, by the machine, from responding to the first request with the first tag information;

receive, through the network interface of the machine, a second request for second tag information from the requester while the requester is in a second location;

determine, at the machine, that the requester is authorized, in the second location, to receive the second tag information; and respond, through the network interface of the machine to the requester, to the second request from the requester with the second tag information, wherein at least one of the first and second tag information includes one or more of an authenticity of an RFID tag, a history of the RFID tag, or a uniform resource locator linked to information about the RFID tag.

2. The network application of claim 1, wherein at least one of the first and second tag information further includes: information about an item associated with the RFID tag.

3. The network application of claim 1, wherein the network application is further configured to cause the machine to determine whether the requester is authorized based on at least one of:

a requester identity;
requester authorization information;
a requester environment; and
restricted-location information associated with the requester.

4. The network application of claim 3, wherein the network application is further configured to cause the machine to determine the restricted-location information based on at least one of a beacon and an infrastructure tag associated with at least one of the first location and the second location.

5. The network application of claim 1, wherein the network application is further configured to cause the machine to determine a requester location based on at least one of a global navigation system, an indoor positioning system, a beacon, an infrastructure tag, and location information from the device with the RFID reader module or the RFID reader.

6. The network application of claim 1, wherein:
the first and second locations are the same but the first and second tag information are different, or
the first and second locations are different but the first and second tag information are the same.

7. The network application of claim 1, wherein the machine is remote from the device with the RFID reader module or the RFID reader.

8. A network application executed on one or more machines, the network application configured to restrict access to Radio Frequency Identification (RFID) tag information based on tag location and cause a machine to:
receive, through a network interface of the machine, a first request from a requester for information about a tag while the tag is in a first location, wherein the requester is a device with an RFID reader module or an RFID reader;
determine, at the machine, that the requester is not authorized to receive the information while the tag is in the first location;
refrain, by the machine, from responding to the first request with the information;
receive, through the network interface of the machine, a second request from the requester for the information while the tag is in a second location;
determine, at the machine, that the requester is authorized to receive the information while the tag is in the second location; and
respond, through the network interface of the machine, to the second request from the requester with the tag information.

9. The network application of claim 8, wherein the tag information includes at least one of:
an authenticity of the tag;
information about an item associated with the tag;
a history of the tag; and
a uniform resource locator linked to information about the tag.

10. The network application of claim 8, wherein the network application is further configured to cause the machine to determine whether the requester is authorized based on at least one of:
a requester identity;
requester authorization information;
a requester environment; and
restricted-location information associated with the requester.

11. The network application of claim 10, wherein the network application is further configured to cause the machine to determine the restricted-location information based on at least one of a beacon and an infrastructure tag associated with at least one of the first location and the second location.

12. The network application of claim 8, wherein the network application is further configured to cause the machine to determine the tag location based on at least one of a global navigation system, an indoor positioning system, a beacon, an infrastructure tag, and location information from the device with the RFID reader module or the RFID reader.

13. The network application of claim 8, wherein the network application is further configured to cause the machine to:
send, to the device with the RFID reader module or the RFID reader through the network interface of the machine, a tag challenge;
receive, from the device with the RFID reader module or the RFID reader through the network interface of the machine, a response to the tag challenge; and
verify, based on at least the response to the tag challenge, that the device with the RFID reader module or the RFID reader is at a location of the tag.

14. A network application executed on one or more machines, the network application configured to restrict access to Radio Frequency Identification (RFID) tag information based on location and cause a machine to:
receive, through a network interface of the machine over a network, a request from a requester for tag information, wherein the requester is a device with an RFID reader module or an RFID reader;
determine, at the machine, a location associated with the received request;
determine, at the machine, restricted-location information;
determine, at the machine, based on at least the location and the restricted-location information, whether the requester is authorized to receive the tag information; and
if the requester is authorized for the tag information, respond, through the network interface of the machine and over the network, to the request from the requester with the tag information, else refrain from responding to the request from the requester with the tag information, wherein at least one of the first and second tag information includes one or more of an authenticity of an RFID tag, a history of the RFID tag, or a uniform resource locator linked to information about the RFID tag.

15. The network application of claim 14, wherein the tag information further includes at least one of:
information about an item associated with the RFID tag.

16. The network application of claim 14, wherein the network application is further configured to cause the machine to determine whether the requester is authorized based on at least one of:
a requester identity;
requester authorization information; and
a requester environment.

17. The network application of claim 14, wherein the network application is further configured to cause the machine to determine the restricted-location information based on at least one of a beacon and an infrastructure tag associated with the location.

18. The network application of claim 14, wherein the location includes at least one of a location of the device with the RFID reader module or the RFID reader and a location of the tag.

19. The network application of claim 14, wherein the network application is further configured to cause the machine to determine the location based on at least one of a global navigation system, an indoor positioning system, a beacon, an infrastructure tag, and location information from the device with the RFID reader module or the RFID reader.

20. The network application of claim 14, wherein the network application is further configured to cause the machine to:
- send, to the device with the RFID reader module or the RFID reader through the network interface of the machine, a tag challenge;
- receive, from the device with the RFID reader module or the RFID reader through the network interface of the machine, a response to the tag challenge; and
- verify, based on at least the response to the tag challenge, that the device with the RFID reader module or the RFID reader is at the location.

\* \* \* \* \*

UNITED STATES PATENT AND TRADEMARK OFFICE
CERTIFICATE OF CORRECTION

PATENT NO. : 10,733,395 B1
APPLICATION NO. : 16/270611
DATED : August 4, 2020
INVENTOR(S) : Christopher J. Diorio et al.

Page 1 of 1

It is certified that error appears in the above-identified patent and that said Letters Patent is hereby corrected as shown below:

On the Title Page

Item (74), Column 2, Line 1, (Attorney Agent, or Firm), Delete "Turk" and insert -- Turk, --, therefor.

In the Specification

In Column 6, Line 3, Delete "of" and insert -- to --, therefor.

Signed and Sealed this
Twenty-seventh Day of October, 2020

Andrei Iancu
*Director of the United States Patent and Trademark Office*